United States Patent
Bassick et al.

(10) Patent No.: US 7,076,808 B2
(45) Date of Patent: Jul. 18, 2006

(54) TACTICAL FLYERS ENSEMBLE

(75) Inventors: John W. Bassick, Paxton, MA (US);
Edward A. DuBois, Auburn, MA (US);
Daniel M. Barry, Oxford, MA (US)

(73) Assignee: David Clark Company Incorporated, Worcester, MA (US)

( * ) Notice: Subject to any disclaimer, the term of this patent is extended or adjusted under 35 U.S.C. 154(b) by 187 days.

(21) Appl. No.: 10/770,635

(22) Filed: Feb. 2, 2004

(65) Prior Publication Data

US 2004/0199984 A1    Oct. 14, 2004

Related U.S. Application Data

(60) Provisional application No. 60/450,307, filed on Feb. 27, 2003.

(51) Int. Cl.
*A41D 13/00* (2006.01)

(52) U.S. Cl. .................................. 2/69; 2/456

(58) Field of Classification Search ........................ 2/69, 2/108, 4, 70, 79, 227, 80, 456, 2.11, 2.14, 2/DIG. 1

See application file for complete search history.

(56) References Cited

U.S. PATENT DOCUMENTS

| 4,932,078 A | * | 6/1990 | Jones et al. | 2/70 |
| 5,182,812 A | * | 2/1993 | Goldsby | 2/79 |
| 5,343,564 A | * | 9/1994 | Reynolds et al. | 2/70 |
| 6,757,916 B1 | * | 7/2004 | Mah et al. | 2/456 |

* cited by examiner

*Primary Examiner*—Tejash Patel
(74) *Attorney, Agent, or Firm*—Gauthier & Connors, LLP

(57) ABSTRACT

A tactical flyers ensemble includes a breathable full pressure half suit ("FPHS") bladder worn as an undergarment beneath a coverall. The coverall has a lower section specially adapted to most effectively constrain the FPHS when the latter is pressurized under flight conditions. Although thus adapted, the coverall remains fully utilitarian and can be worn with or without the FPHS under conditions other than those immediately preparatory to or during actual flight.

2 Claims, 1 Drawing Sheet

TACTICAL FLYERS ENSEMBLE

CROSS REFERENCE TO RELATED APPLICATIONS

This application claims priority of provisional patent application Ser. No. 60/450,307 filed on Feb. 27, 2003.

BACKGROUND OF THE INVENTION

1. Field of the Invention

This invention relates to protective garments of the type worn by the crewmembers of high performance military (tactical) aircraft.

2. Description of the Prior Art

Known protective garment technologies are disclosed, for example, in U.S. Pat. No. 2,762,047 (Flagg et al.); U.S. Pat. No. 5,003,630 (Bassick et al.); and U.S. Pat. No. 5,394,563 (Doyle), the descriptions of which are herein incorporated by reference.

The Flagg et al. garment was designed to apply pressure to the lower torso and legs of a crew member and included as integral components an inner tight-fitting sleeve cooperating with a looser-fitting sheath to define a pressure chamber therebetween. The sheath was in turn encased in a fabric outer garment serving to restrain expansion of the sheath when the chamber was pressurized.

Although successful in achieving its principal objective of pressure application, the Flagg et al. garment inhibited the natural dissipation of the wearer's metabolic heat output via perspiration evaporation. Thus, in order to offset the resulting discomfort and reduction in performance due to heat stress, it often became necessary to integrate complex and burdensome cooling systems into the Flagg et al. protective garments.

The heat dissipation problem was finally addressed satisfactorily by forming the bladder components of pressure garments with flexible micro-porous materials, as described in the Bassick et al. patent.

Subsequent developments of protective garment materials included the introduction of low elongation fabrics of the type disclosed in the Doyle patent, designed specifically to reduce ballooning or dimensional growth of pressurized garments, which presents interference within cockpits of high performance military aircraft. Such low elongation fabrics are necessarily heavier weight than conventional fabrics, and when used for anti-G garments in conjunction with standard military flyers coveralls, as is the present military standard convention, the total combined weight and bulk is less than satisfactory.

Modern day military flyers coveralls have remained essentially the same since their introduction except for raw material improvements, which progressed from cotton to nylon and presently to Nomex. Present flyers coveralls are nonspecific to aircraft type, with the same coveralls issued to military flyers of rotary wing, fixed wing, multi-place transport, strategic bomber, and tactical fighter aircraft. The flight envelope and mission of the latter are uniquely different from the others insofar as they include high acceleration (G) performance requirements, which necessitate unique, mission-specific protective garments for tactical flyers to perform optimally in a high-G environment. Tactical mission-specific protective equipment, e.g., anti-G suit, is worn over the standard issue flyers coverall, adding duplicative protective layers that add bulk, compromise comfort and performance, and exacerbate stress and fatigue in what is by definition already a highly stressful mission environment. The recent trend of increasing anti-G suit (4 ply, partial pressure type) coverage of the lower extremities up to full coverage (e.g., USAF Advanced Technology Anti-G Suit—ATAGS) in order to increase G protection has compounded the problem of thermal loading and excessive bulk and consequently has been deemed less than satisfactory by tactical aircrews, especially in warm climates. Additionally, the rapid response capability associated to the tactical flyers' mission necessitates their flying coverall also be utilitarian to the maximum extent practical, as with the present standard coverall.

A principal objective of the present invention is to provide a tactical flyers coverall that is both optimally effective and comfortable when worn in conjunction with other mission-specific protective equipment in high performance tactical aircraft and also is sufficiently utilitarian to be worn comfortably in pre- and post-flight environments.

The novelty of the tactical flyers ensemble lies in the fact that it combines the most efficient method of applying pressure to the body (full pressure, as embodied in the Flagg et al. garment, also known as a full pressure half suit) for acceleration protection with a tactical mission-specific designed flyers coverall such that the tactical flyers ensemble's maximum cross-sectional composition is only one or two-ply breathable materials versus the current standard flyers coverall and anti-G suit combination of five plies, two of which are nonbreathable.

SUMMARY OF THE INVENTION

In accordance with the present invention, a tactical flyers ensemble includes a breathable full pressure half suit ("FPHS") bladder worn as an undergarment beneath a coverall. The coverall has a lower section specially adapted to most effectively constrain the FPHS when the latter is pressurized under flight conditions. Although thus adapted, the coverall remains fully utilitarian and can be worn with or without the FPHS under conditions other than those immediately preparatory to or during actual flight.

These and other features of the present invention will now be described in greater detail with reference to the accompanying drawings, wherein:

DETAILED DESCRIPTION OF PREFERRED EMBODIMENT

Figures 1, 2:
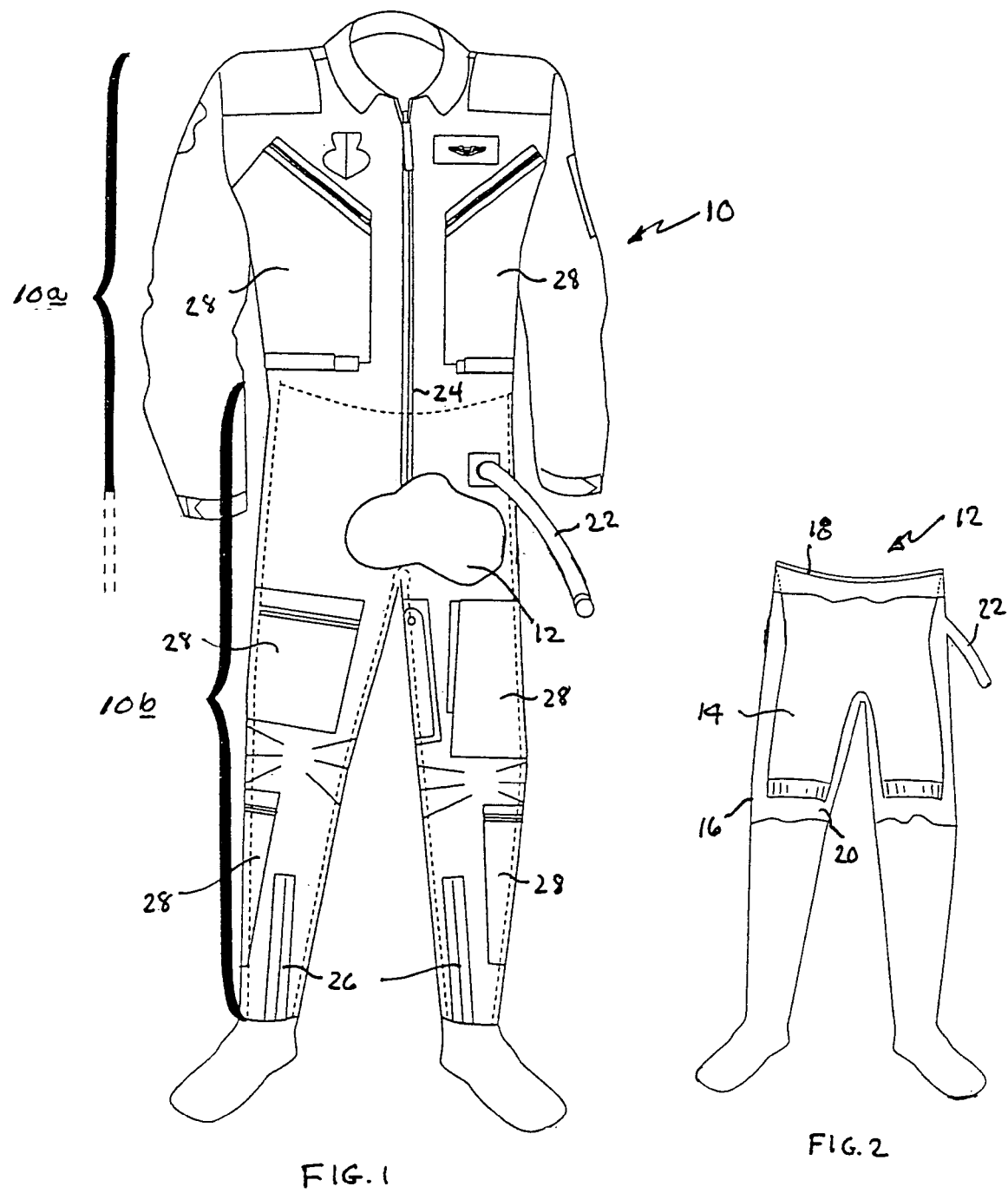
FIG. 1 is a front view of a garment ensemble in accordance with the present invention.
FIG. 2 is a partially broken away view of the undergarment component of the ensemble.

With reference to FIGS. 1 and 2, a tactical flyers ensemble in accordance with the present invention includes a conventionally configured coverall 10 specially adapted to be worn over a FPHS 12. The FPHS includes an inner component 14 configured and dimensional to fit snugly around the lower torso and thighs of the wearer and an outer loosely fitting sheath 16 sealed to the inner component at 18. The outer sheath includes integral portions enclosing the lower torso, legs, and feet of the wearer and, together with the inner component, defines a chamber 20 that may be pressurized via a tube 22. The inner component and outer sheath are fabricated from a flexible breathable material of the type described in the Bassick et al. patent. Such materials, hereinafter referred to as "micro-porous" materials, comprise at least two layers, with the innermost layer being hydrophilic and arranged to face inwardly towards the wearer's body, and with the outermost layer being hydrophobic and arranged to face outwardly away from the wearer's body.

The coverall 10 has upper and lower sections 10a, 10b, with the lower section being fabricated from a breathable and flexible low stretch Nomex fabric. As herein employed, the term "low stretch fabric" means fabrics of the type described in the Doyle patent, comprising woven warp and filling yarns, with the filling yarns having a diameter and spacing greater than that of the warp yarns. The upper section 10a is fabricated of a different material, which preferably will also comprise Nomex, but of the conventional relatively more stretchable type. The coverall includes conventional zippers 24, 26 to facilitate donning and an array of pockets 28 configured and positioned to accommodate the various needs of the wearer. The materials forming the upper and lower sections of the coverall are fully breathable, with the lower elongation material of the lower section serving as a functional restraint layer for the FPHS. The lower section of the coverall is patterned so as to minimize ballooning or dimensional growth and maximize wearer comfort and mobility, particularly leg/knee mobility, when the FPHS is pressurized.

The lower section of the coverall may also include special sizing adjustment features similar to those found on standard anti-G suits; e.g., adjustable lacing and/or slide fasteners for sizing customization and/or facilitation of donning and doffing.

An opening in the midsection of the coverall allows the FPHS pressurization tube 22 to pass through for connection to the aircraft-mounted anti-G valve.

In light of the foregoing, it will now be understood that the tactical flyers ensemble of the present invention offers a combination of advantages not heretofore available in prior art protective garments. These include a minimum number of plies, all of breathable materials, thereby providing light weight, freedom of movement, and relatively unfettered dissipation of metabolic heat. The lower section of the outer coverall effectively serves as an efficient restraining layer for the FPHS without adversely impacting the utilitarian nature of the garment for uses other than flight conditions.

We claim:

1. A protective garment ensemble for the crew member of a high performance military aircraft, said ensemble comprising:

an undergarment configured to apply pressure to the lower torso and legs of the crew member, said undergarment including as integral components an inner tight-fitting sleeve cooperating with a loose-fitting outer sheathe to define a pressure chamber therebetween, said sleeve and sheathe being fabricated from a flexible microporous material;

a coverall having an upper section configured to enclose the upper torso and arms of the crew member, and a lower section configured to enclose the lower torso and legs of the crew member, at least said lower section being fabricated of a breathable and flexible low stretch fabric; and conduit means for introducing a pressurized fluid into said pressure chamber, said conduit means comprising an integral component of said undergarment and being arranged to project through an opening in said coverall.

2. The garment ensemble of claim 1 wherein the upper section of said coverall is fabricated from a breathable flexible material.

\* \* \* \* \*